United States Patent
Lu et al.

(10) Patent No.: US 10,061,640 B1
(45) Date of Patent: *Aug. 28, 2018

(54) SOFT-DECISION INPUT GENERATION FOR DATA STORAGE SYSTEMS

(71) Applicant: Western Digital Technologies, Inc., Irvine, CA (US)

(72) Inventors: Guangming Lu, Irvine, CA (US); Kent D. Anderson, Broomfield, CO (US); Anantha Raman Krishnan, Irvine, CA (US); Shafa Dahandeh, Laguna Niguel, CA (US)

(73) Assignee: Western Digital Technologies, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/797,943

(22) Filed: Mar. 12, 2013

(51) Int. Cl.
*H03M 13/00* (2006.01)
*G06F 11/10* (2006.01)

(52) U.S. Cl.
CPC ..................... *G06F 11/10* (2013.01)

(58) Field of Classification Search
CPC ....... G11C 16/26; G11C 7/14; G11C 11/5642; G06F 11/10; G06F 11/1048
USPC ............. 714/773; 711/103, E12.008
See application file for complete search history.

(56) References Cited

U.S. PATENT DOCUMENTS

| | | | |
|---|---|---|---|
| 5,299,162 A | 3/1994 | Kim et al. | |
| 7,558,109 B2 | 7/2009 | Brandman et al. | |
| 7,805,663 B2 | 9/2010 | Brandman et al. | |
| 7,904,793 B2 | 3/2011 | Mokhlesi et al. | |
| 8,156,398 B2 | 4/2012 | Sommer | |
| 8,156,403 B2 | 4/2012 | Shalvi et al. | |
| 8,243,514 B2 | 8/2012 | Kang et al. | |
| 8,730,606 B1* | 5/2014 | Tan et al. | 360/53 |
| 2009/0177931 A1* | 7/2009 | Song et al. | 714/704 |
| 2010/0246287 A1* | 9/2010 | Vigoda et al. | 365/189.15 |
| 2011/0167305 A1* | 7/2011 | Haratsch et al. | 714/42 |
| 2011/0191652 A1 | 8/2011 | Dave et al. | |
| 2011/0225350 A1* | 9/2011 | Burger et al. | 711/103 |
| 2012/0008386 A1* | 1/2012 | Chilappagari et al. | 365/185.2 |
| 2012/0063227 A1 | 3/2012 | Weingarten et al. | |
| 2012/0224420 A1* | 9/2012 | Sakurada et al. | 365/185.03 |
| 2012/0236638 A1 | 9/2012 | Weingarten et al. | |
| 2014/0233322 A1* | 8/2014 | Wu et al. | 365/185.24 |

* cited by examiner

*Primary Examiner* — Kyle Vallecillo
(74) *Attorney, Agent, or Firm* — McDermott Will & Emery LLP

(57) ABSTRACT

An error management system for a data storage device can generate soft-decision log-likelihood ratios (LLRs) using multiple reads of memory locations. Bit patterns provided by multiple reads of reference memory locations can be counted and used to generate probability data that is used to generate possible LLR values for decoding target pages. Possible LLR values are stored in one or more look-up tables.

18 Claims, 9 Drawing Sheets

BIT PATTERN PROBABILITIES

SOFT-DECISION INPUT GENERATION FOR DATA STORAGE SYSTEMS

BACKGROUND

Technical Field

This disclosure relates to data storage systems. More particularly, the disclosure relates to systems and methods for generating log-likelihood ratios for data storage systems.

Description of the Related Art

Soft-decision low-density parity-check code (LDPC) error code correction (ECC) can improve the reliability of a data storage system and reduce the number of data errors. Log-likelihood ratios (LLRs) are commonly used as the inputs for soft-decision LDPC engines. Data storage systems that use flash memories (e.g., NAND) as data storage media can use LLR calculations for reading memory cells when LDPC based on single read input is insufficient to decode the originally-stored data.

BRIEF DESCRIPTION OF THE DRAWINGS

Various embodiments are depicted in the accompanying drawings for illustrative purposes, and should in no way be interpreted as limiting the scope of the inventions. In addition, various features of different disclosed embodiments can be combined to form additional embodiments, which are part of this disclosure. Throughout the drawings, reference numbers may be reused to indicate correspondence between reference elements.

DETAILED DESCRIPTION

Figure 1A:
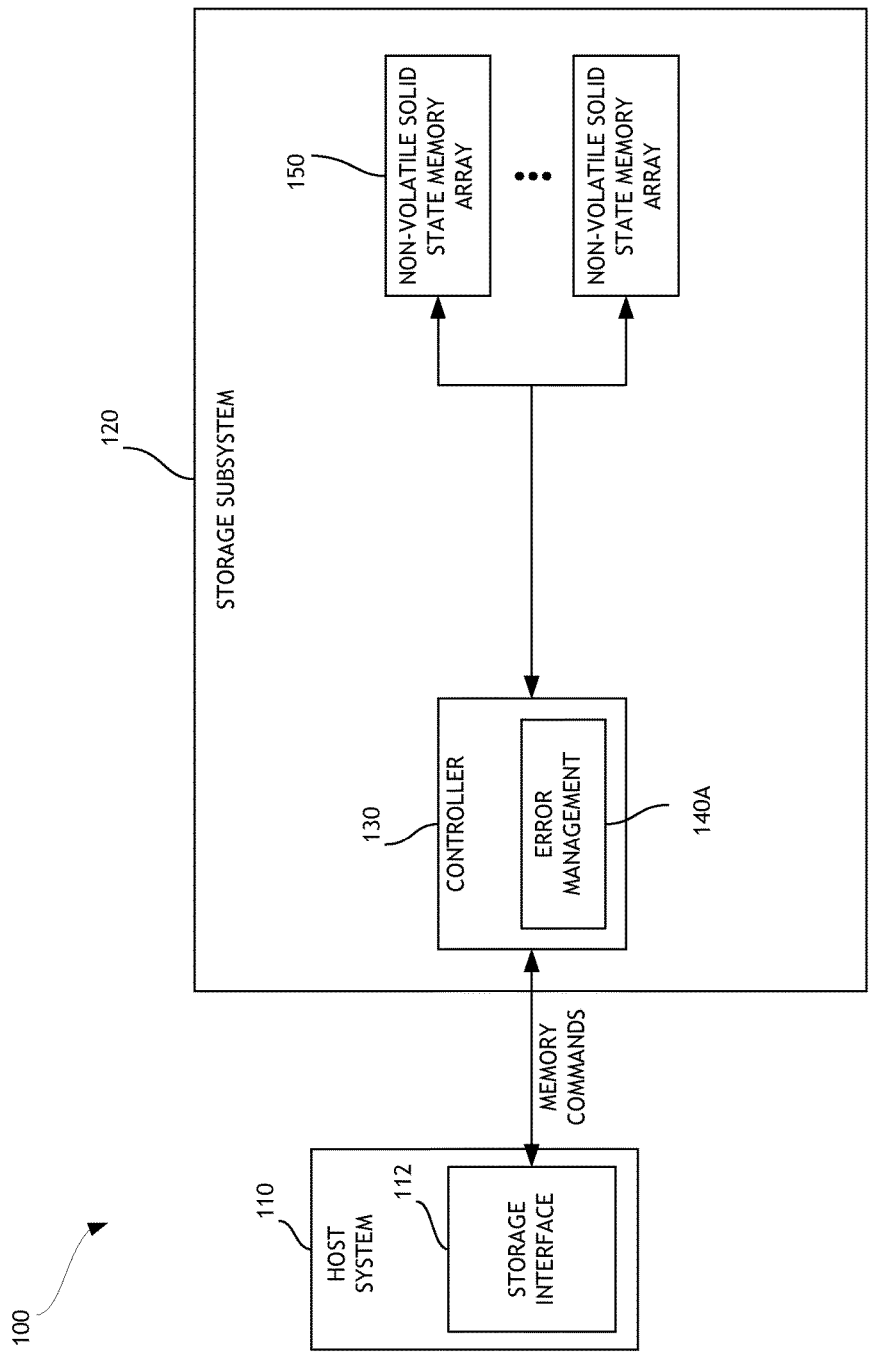
FIG. 1A is a block diagram illustrating an embodiment of a combination of a host system with storage device including an error management module.

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Overview

Data storage cells in solid state drives (SSD), such as multi-level-per-cell (MLC) flash memory, may have distinct threshold voltage distribution ($V_t$) levels, corresponding to different memory states. For example, in an MLC implementation, different memory states in an SSD may correspond to a distribution of voltage levels ranging between voltage read levels; when the charge of a memory cell falls within a particular range, one or more reads of the page may reveal the corresponding memory state of the cell. The term "read" is used herein with respect to voltage reads of SSDs according to its broad and ordinary meaning, and may refer to read operations on a page, including a plurality of cells (e.g., thousands of cells), or may be used with respect to a voltage charge level of a single memory cell.

Voltage read levels can advantageously be set to values in the margins between memory states. According to their charge level, memory cells store different binary data representing user data. For example, based on its charge level, each cell generally falls into one of the memory states, represented by associated data bits. Performing cell reads at the various read levels can provide 1-bit input data for identifying the memory states with which certain cells are associated when the distributions for different states are tightly clustered and there is no overlap between them.

Over time, and as a result of various physical conditions and wear from repeated program/erase (P/E) cycles, the margins between the various distribution levels may be reduced, so that voltage distributions overlap to some extent. Such reduction in read margin may be due to a number of factors, such as loss of charge due to flash cell oxide degradation, over-programming caused by erratic program steps, programming of adjacent erased cells due to heavy reads or writes in the locality of the cell (or write disturbs), and/or other factors. When voltage distributions overlap, single-read inputs may not provide enough information to decode the original data.

Soft-decision inputs, such as log-likelihood ratios (LLRs), can enhance the probability of successful decoding in certain situations. However, in certain embodiments, SSDs are not configured to provide soft-decision data. For example, an SSD may present a binary interface, wherein the SSD returns binary data based on reads of the SSD at various voltage threshold levels. Such voltage threshold levels utilized by the SSD may be adjustable or configurable in certain configurations. In order to provide more reliable data input, it may be desirable for an SSD controller to generate soft-decision data based on binary return values provided by SSDs. Certain embodiments disclosed herein provide for soft-decision input generation for a decoding module, such as a low-density parity check (LDPC) decoder, using a multiple-read technique. Certain embodiments further provide systems and methods for SSD channel estimation, as well as optimal $V_t$ tracking for SSDs to improve utilization of the decoder correction capability.

"Page," or "E-page," as used herein may refer to the unit of data correction of embodiments disclosed herein. For example, error correction/calibration operations may be performed on a page-by-page basis. A page of data may be any suitable size. For example, a page may comprise 1 k, 2 k, 4 k, or more bytes of data. Furthermore, the term "location," or "memory location" is used herein according to its broad and ordinary meaning and may refer to any suitable partition of memory cells within one or more data storage devices. A memory location may comprise a contiguous array of memory cells or addresses (e.g., a page).

As used in this application, "non-volatile solid-state memory" may refer to solid-state memory such as NAND flash. However, the systems and methods of this disclosure may also be useful in more conventional hard drives and hybrid drives including both solid-state and hard drive components. Solid-state memory may comprise a wide variety of technologies, such as flash integrated circuits, Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), MRAM, or other discrete NVM (non-volatile solid-state memory) chips. The non-volatile solid-state memory arrays or storage devices may be physically divided into planes, blocks, pages, and sectors, as is known in the art. Other forms of storage (e.g., battery backed-up volatile DRAM or SRAM devices, magnetic disk drives, etc.) may additionally or alternatively be used.

System Overview

FIG. 1A is a block diagram illustrating an embodiment of a combination of a host system 110 with storage device 120 incorporating error management functionality. As shown, the storage device 120 includes a controller 130, which in turn includes an error management module 140A. In certain embodiments, the error management module 140A is configured to detect and correct certain kinds of internal data corruption of one or more non-volatile solid-state memory arrays 150. In one embodiment, the error management module 140A may include an encoder (e.g., an LDPC encoder) to encode data written to the memory array 150 and a decoder (e.g., an LDPC decoder) to decode data read from the memory array 150. In one embodiment, the error management module 140A is configured to generate LLRs for cells of the memory array 150 for soft-decision error correction.

In certain embodiments, the controller 130 is configured to receive memory access commands from a storage interface (e.g., driver) 112 residing on a host system 110. The controller 130 is configured to execute commands in response to such host-issued memory commands in the non-volatile solid-state memory arrays 150. Data may be accessed/transferred based on such commands. In one embodiment, the storage device 120 may be a hybrid disk drive that additionally includes magnetic memory storage (not shown). In such case one or more controllers 130 would control the magnetic memory storage and the non-volatile solid-state memory array(s) 150.

Figure 1B:
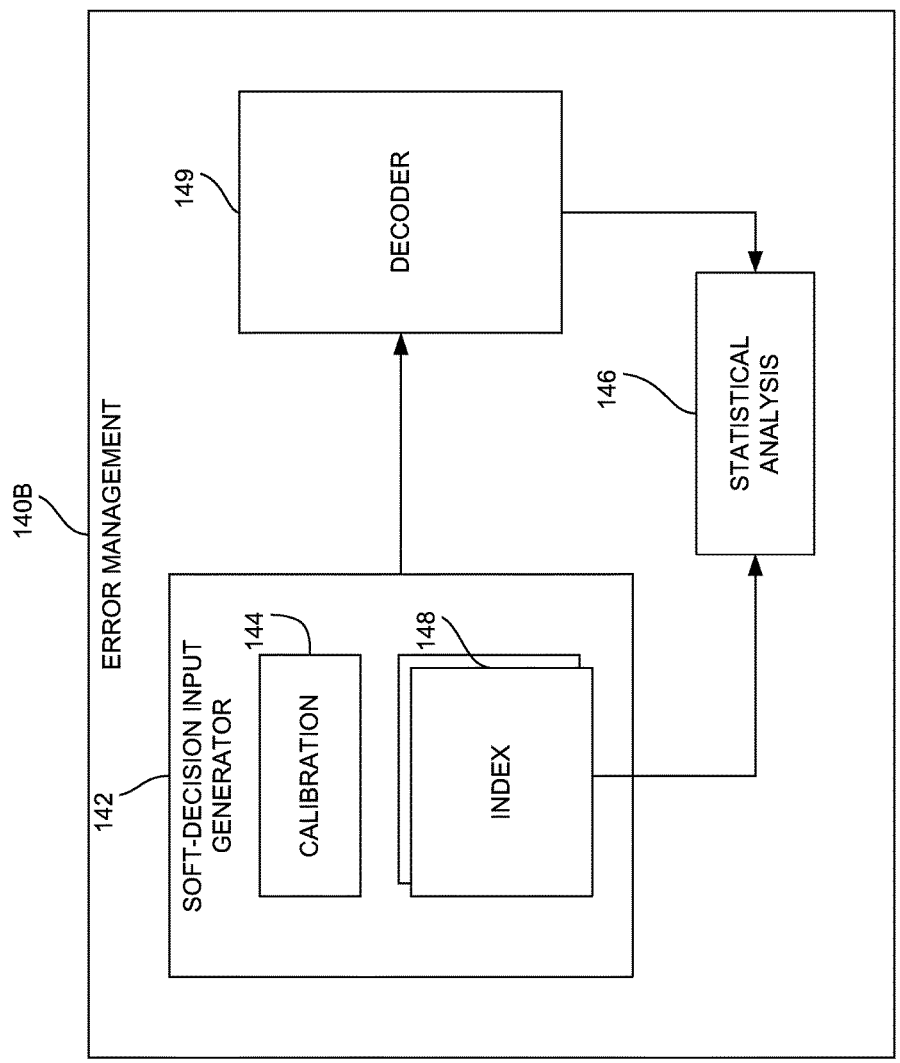
FIG. 1B is a block diagram illustrating an embodiment of an error management module.

FIG. 1B is a block diagram illustrating an embodiment of an error management module 140B, which may correspond to the error management module 140A shown in FIG. 1A. In certain embodiments, the error management module 140B includes a soft-decision input generator 142 for generating soft decision input that may be used by a decoder module 149. The soft-decision input generator 142 may be configured to quantize binary inputs to multiple-bit values, which may be used to provide multiple-bit input to the decoder 149. Therefore, the soft-decision input generator 142 may be configured to emulate soft-decision input using binary values. In certain embodiments, soft-decision decoding provides improved performance with respect to comparable hard decision decoding techniques.

The error management module 140B includes a calibration module 144, one or more indexes for storing look-up tables (LUTs) containing possible soft-decision input values, and a statistical analysis module 146. The error management module 140B may further include a module (not shown) for tracking voltage threshold levels for determining relative optimal voltage threshold levels. For example, the voltage threshold tracking module may report one or more E-page reads having minimum bit-flip error counts from among a plurality of E-page reads associated with different read levels. For example, a page A may be read three times at different voltage read levels, resulting in three read copies $A_1$, $A_2$, and $A_3$ and the tracking module may find that $A_1$ results in the fewest bit-flip error as compared the decoded page A.

The error management module 140B may be configured to perform soft-decision calibration using the calibration module 144, wherein possible LLR values are stored by the calibration module 144 in one or more local and/or remotely-stored LUTs, which can be used by the error management module 140B for decoding target data as needed. When a target page cannot be decoded using hard-decision input, the appropriate LUT may be provided to the soft-decision input generator with the target data. Calibration may be performed periodically using a background process, and may be performed on a per-block, or per-die basis. For example, a calibration can be performed based on a reference page within each of blocks $B_1$, $B_2$, . . . , $B_N$. If a read on a page (the target page) in block $B_3$ encounters an error, then the soft-decision data based on calibration on the reference page within $B_3$ can be used to help decode that target page in block $B_3$. For example, calibration may performed according to a firmware-based schedule, which may dictate calibration on a daily, weekly, monthly, or other basis.

The calibration module 144 is configured to generate possible LLR values based on one or more reads of a reference memory location and comparison of such read values with known reference values stored in the reference memory location. The calibration module 144 may further populate one or more LUTs 148 with the generated LLR values. The LLR values stored in the LUT(s) may be used by the error management module 140B as inputs to the decoder 149 in association with the decoding of target memory locations related to the reference location. In addition to the index 148, one or more indexes/LUTs may be stored externally to the error management module 140B. For example, multiple LUTs, each associated with different reference locations may be stored externally. When the error management is tasked with decoding a particular target location, the LUT associated with the corresponding reference location may be accessed and used by the error management module 140B to provide soft-input values to the decoder 149. LUTs may be any suitable size. For example, in certain embodiments, LUTs have dimensions of n×m, wherein n may correspond to the maximum number of multi-reads supported+1 and m may correspond to the bit width of the LLR, which in one embodiment is equal to the decoder's internal precision. In one embodiment, the dimension used is 8×8.

The statistical analysis module 146 may include functionality for determining certain statistical information for 1-read and/or multiple-read decoding operations. For example, the statistical analysis module 146 may determine one or more of the following: total bit-error count, 1-to-0 flip count, and 0-to-1 flip count, wherein total bit-error count is the sum of 1-to-0 and 0-to-1 flip counts. The statistical analysis module 146 may make such determinations based at least in part on LLR input values stored in the index 148, as well as information from the decoder 149. In certain embodiments, the statistical analysis module 146 determines which among a plurality of voltage level reads of a location has the minimum total bit-error count. The corresponding voltage read level may be considered the optimal read level for the location.

Figure 2:
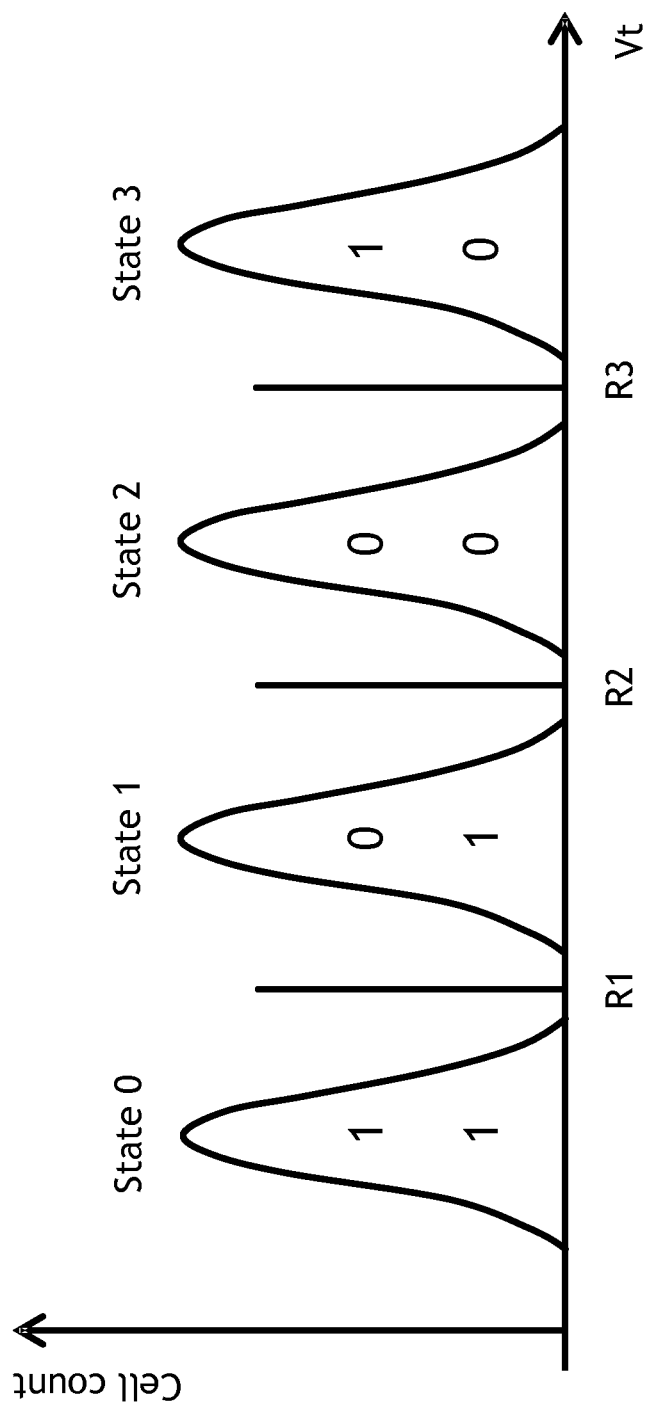
FIG. 2 is a graph showing a probability distribution of cells in a non-volatile solid-state memory array according to one embodiment.

FIG. 2 is a graph showing a probability distribution of cells in a non-volatile solid-state memory array according to one embodiment. Flash memory, such as multi-level cell (MLC) NAND flash memory, may store two or more bits of information per cell. While certain embodiments disclosed herein are described in the context of MLCs, it should be understood that the concepts disclosed herein may be compatible with single level cell (SLC), three-level cell (TLC) technology (a type of MLC NAND), and/or other types of technology. Data is generally stored in MLC NAND flash memory in binary format. For example, two-bit-per-cell memory cells can have 4 distinct threshold voltage ($V_t$) levels, and 3-bit-per-cell memory cells can have 8 distinct $V_t$ levels, and so on. According to their $V_t$, and the coding associated with their $V_t$, memory cells store different binary bits.

The horizontal axis depicted in FIG. 2 represents cell voltage level. The vertical axis represents the number of cells that have the corresponding voltage values. Thus, the four distribution curves represent the number of cells, broken down by the four distributions, which have the corresponding voltage values. As shown, the voltage distribution of the memory cells may include a plurality of distinct levels, or states (e.g., States 0-3 in this example 2-bit-per cell MLC configuration, as shown). Read reference values (i.e., voltage threshold levels R1-R3) may be placed between these levels. The gap between the levels (i.e., margin between programmed states), in which the read voltage references may advantageously be positioned in certain embodiments, is referred to as "read margin." Over time, and as a result of various physical conditions and wear, for example from being subjected to repeated P/E cycles, the read margins between the various distribution levels may be reduced, resulting in both data retention problems and higher read errors beyond certain limits. Such reduction in read margin may be due to a number of factors, such as loss of charge due to flash cell oxide degradation, over-programming caused by erratic program steps, programming of adjacent erased cells due to heavy reads or writes in the locality of the cell (or write disturbs), and/or other factors.

While the diagram of FIG. 2 illustrates a $V_t$ distribution for 2-bit-per-cell flash memories, embodiments and features disclosed herein may be applicable to other types of coding schemes. With respect to the embodiment of FIG. 2, the coding for States 0-3 can be, for example, '11,' '01,' '00,' and '10,' or any other coding. Each cell may generally fall into one of the illustrated states and correspondingly represents two bits. For one word line (WL), which can be connected to tens of thousands of cells in a NAND array, the lower digit of the cells may be referred to as the "lower page," and the upper digit may be referred to as the "upper page." For 3-bit-per-cell flash memories, there may also be intermediate digits, which may be referred to as "middle pages." Reading voltage levels and operations are dependent on the coding of these states. For example, for the coding as shown in FIG. 2 for the 2-bit-per-cell flash memories, one read at R2 may be required to read out the lower page, and two reads at both R1 and R3 may be required to read out the upper page. As shown in the distribution of FIG. 2, these reading voltages may be selected between state distributions in the case where the distributions for different states are narrow so that there is no overlap between them.

Soft Decision Input Generation—Scaled Approach

With further reference to FIG. 1B, the soft-decision input generator 142 may be configured to generate soft-decision inputs based on a single read of a memory location, wherein multiple-bits of information are generated based on a single binary value. In such a configuration, binary values returned by memory arrays may be up-scaled in order to generate the appropriate number of bits. For example, binary values of 0 and 1 may be up-scaled by a scale factor corresponding to the internal bit-width of the decoder.

Figure 3:
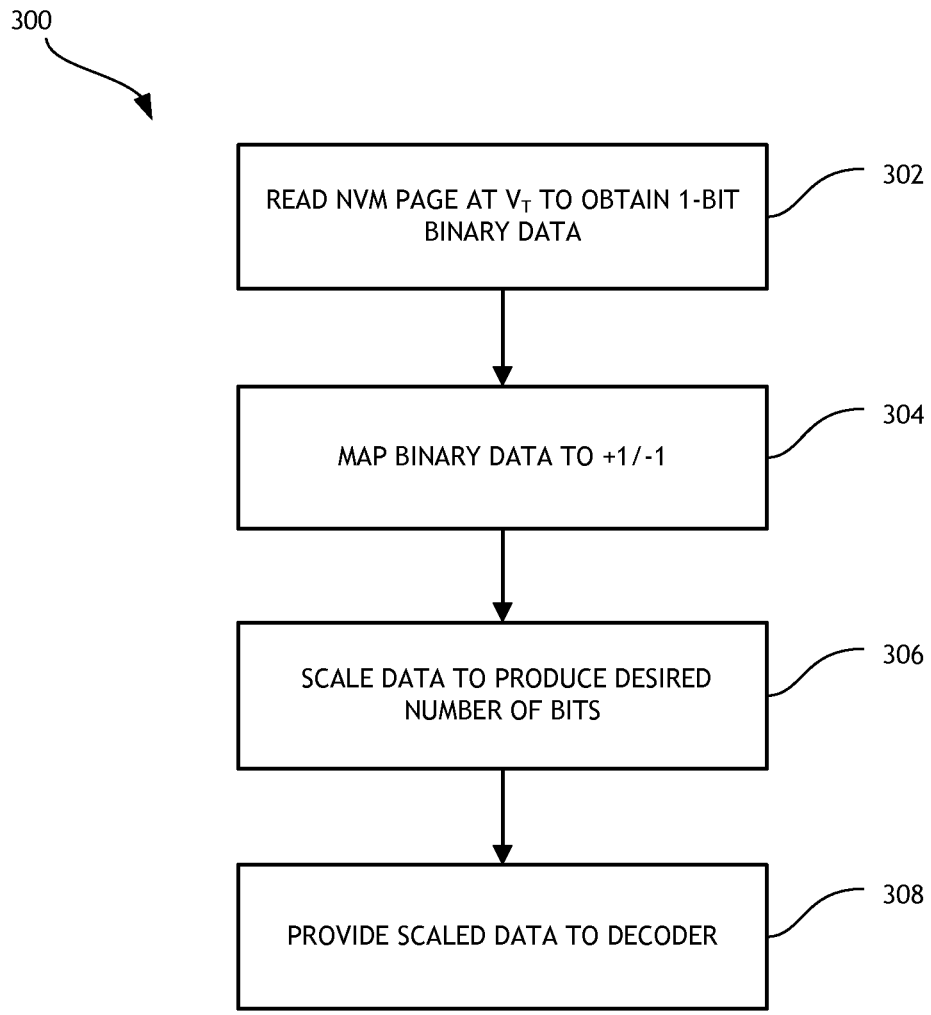
FIG. 3 is a flow diagram for an embodiment of a 1-read soft-decision input generation process.

FIG. 3 is a flow diagram for an embodiment of a 1-read soft-decision input generation process 300. The process 300 includes reading a target page at a predetermined voltage threshold level to obtain a 1-bit binary data value at block 302. In certain embodiments, the 1-bit values are mapped to the values +1 and −1 at block 304. For example, a binary value of '0' may be mapped to +1, while the binary value of '1' may be mapped to −1. The values are then scaled up by a certain scale factor in order to generate the desirable number of bits of data for use by the relevant decoder, such as an LDPC decoder. By such procedure, each 1-bit data value may be converted to an n-bit value, where n is the internal bit-width of the decoder core.

Soft Decision Input Generation—Multi-Read Approach

Figure 4:
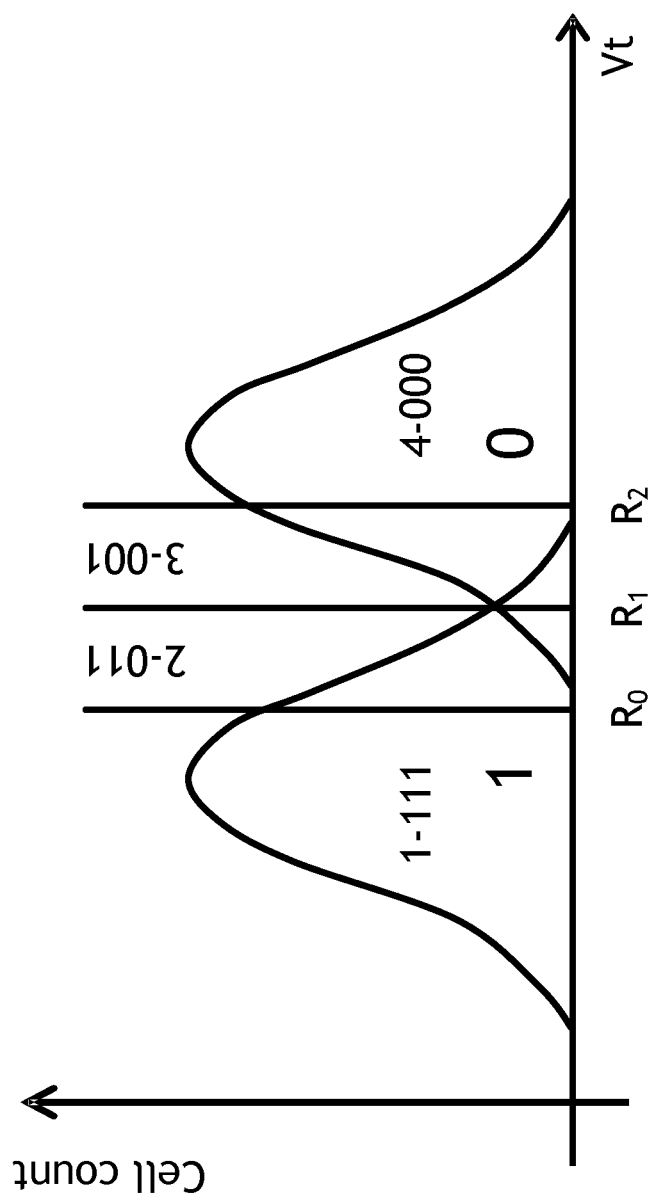
FIG. 4 is a graph showing a probability distribution of cells in a non-volatile solid-state memory array according to one embodiment.

Single-read soft-decision input generation may not provide sufficient or desirable information for certain purposes. Therefore, certain embodiments disclosed herein provide a soft-decision input generator that is configured to generate soft-decision inputs based on multiple reads of a memory location, thereby providing multiple bits of data from which to generate soft-decision inputs. FIG. 4 is a graph showing a probability distribution of cells in a non-volatile solid-state memory array illustrating a multiple-read scheme. As discussed above, due to the memory wearing out, loss of data retention, and the like, the states of a voltage distribution can widen and overlap. Reading at a single read voltage (e.g., $R_1$) may not be enough to decode the original data, as one or more of the probability distributions cross over the read level. Therefore, utilizing certain ECC schemes, such as single-read LDPC, may be insufficient to correctly decode the data. Although multiple-read schemes may be computationally complex and time-consuming, multiple reads can provide increased performance in certain situations with respect to single-read solutions.

In the multiple-read scheme illustrated in FIG. 4, three reads are involved, with reading voltages at $R_0$, $R_1$, and $R_2$. These three reading voltages divide the distribution shown into four zones (e.g., zones 1-4, from left to right). Although three reading voltages are illustrated in FIG. 4, certain embodiments may include more than three reading voltages, such that the distribution may be divided into more than four zones. For example, 4, 5, 6, 7 or more reads may be taken in association with a junction between memory states. Flash cells having charge levels in the different zones may return different values corresponding to the respective zone. For example, in certain embodiments, flash cells read having a charge level within zone 1 may return '1' for each of the three reads, thereby providing three bits of information ('111'); cells read having a charge level within zone 2 return '011'; cells read having a charge level within zone 3 return '001'; and cells read having a charge level within zone 4 return ('000'). If the data are known, the LLRs for these 4 groups of number combination may be obtained. For example, if there are a total of N cells in zone 1, among which the real values of m cells are 0, LLRs can be determined using the following equation: $LLR(111)=\log(m/N-m)$. Although FIG. 4 shows three reads and four zones, more reads and zones are possible in other embodiments, and the LLRs may be generated in a similar manner to that described above.

Figure 5A:
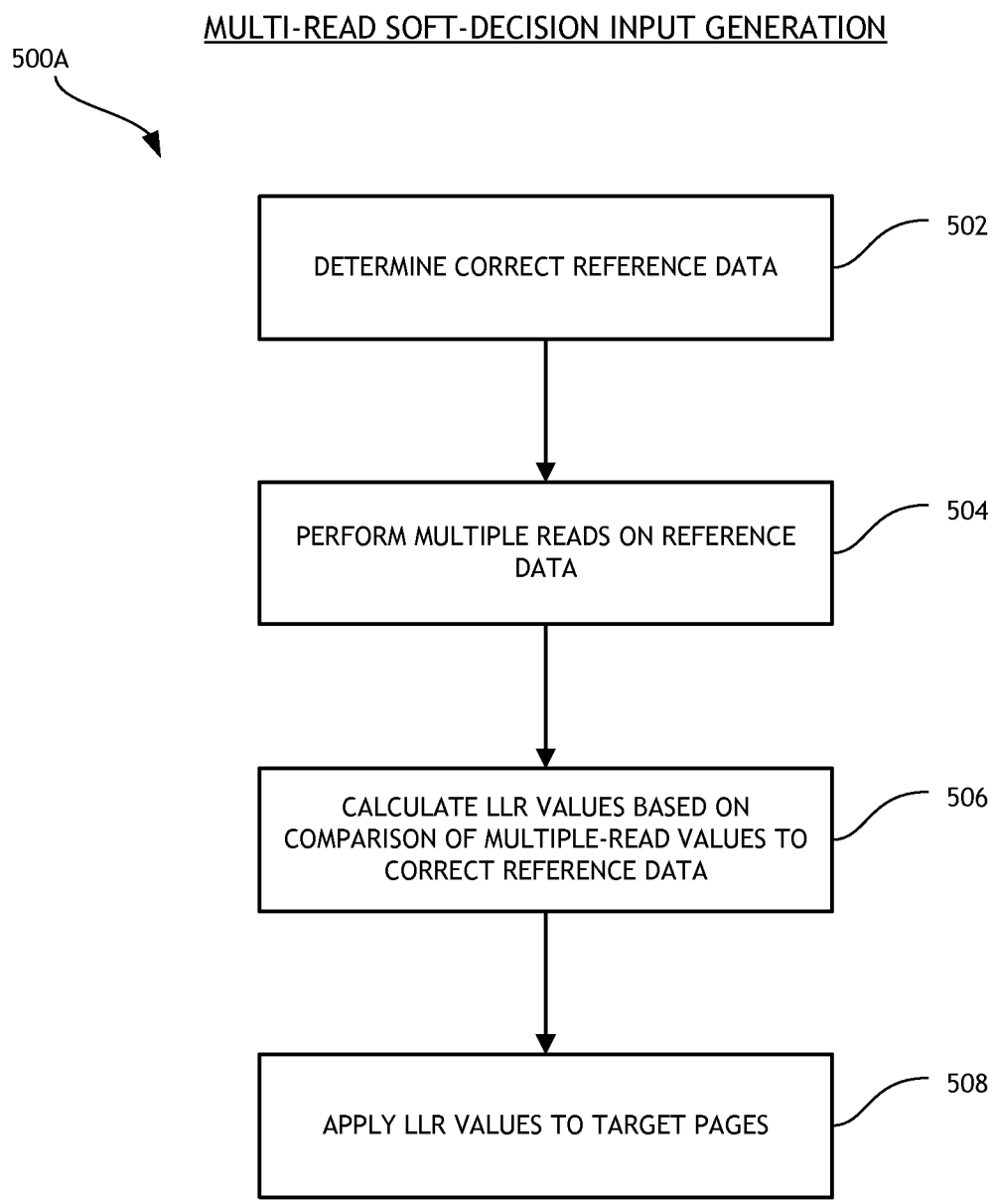
FIG. 5A is a flow diagram illustrating an embodiment of a process of generating soft-decision LLR inputs using multiple reads.

FIG. 5A is a flow diagram illustrating an embodiment of a process 500A of generating soft-decision LLR inputs using multiple reads. The process 500A is described with reference to FIG. 1B for illustrative purposes, and may be performed by the error management module 140B of FIG. 1B. In one embodiment, the process begins at block 502 where correct reference data is determined. Then in block 504, multiple reads with different voltage thresholds are performed on the reference data. In block 506, LLR values are calculated based on comparison of multiple read values to correct reference data. In block 508, the LLR values are applied to decode target memory location(s). During decoding of a memory location, read errors may be encountered and soft-decision data may be used for decoding data stored in the memory location. Therefore, in certain embodiments, part of the process 500A (e.g., block 508) is performed after hard-decision error correction fails with respect to one or more target memory locations. Other parts of the process 500A may be performed periodically, apart from the occurrence of a failure to hard-decision error correction.

Figure 5B:
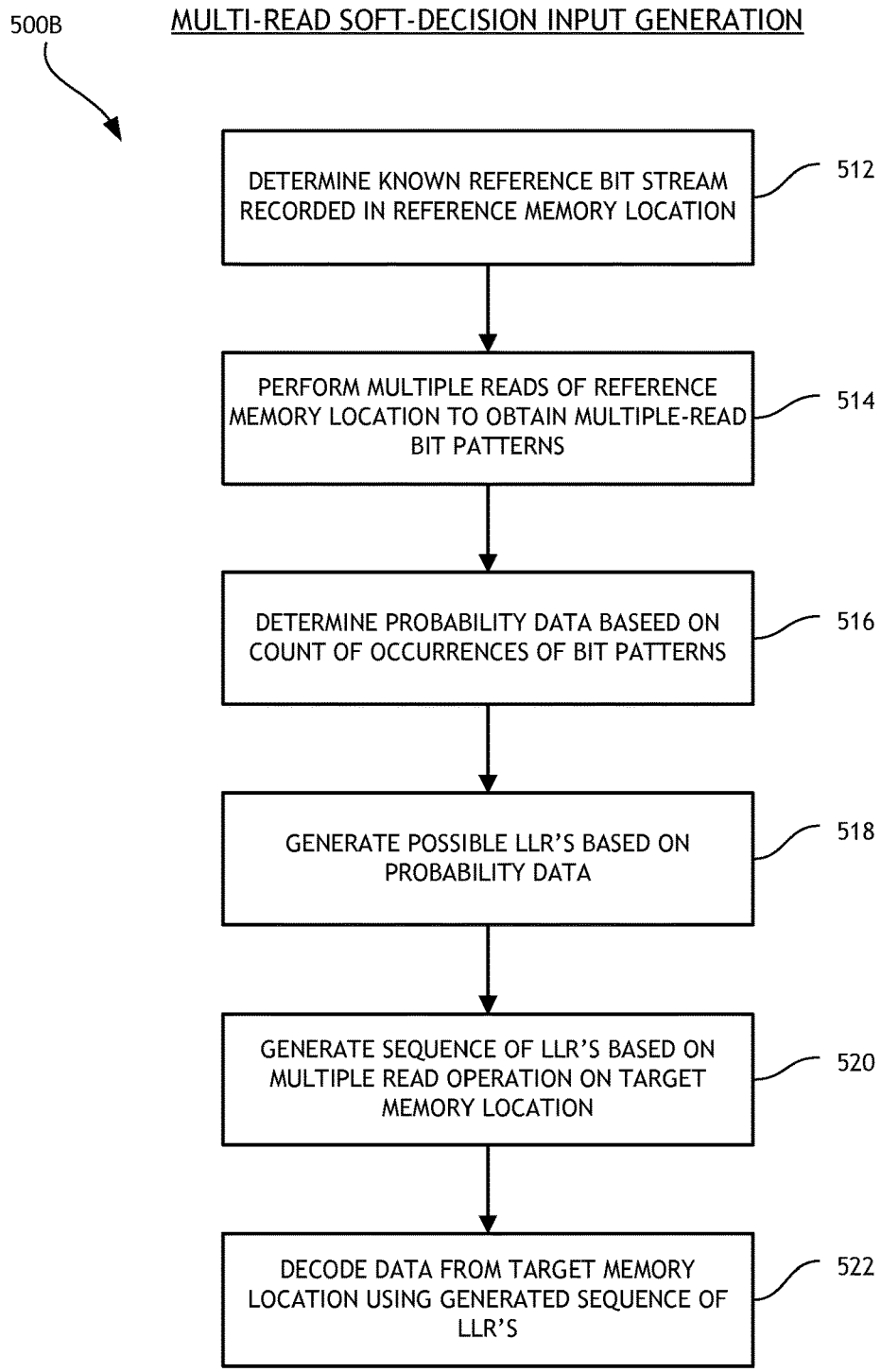
FIG. 5B is a flow diagram illustrating an embodiment of a process of generating soft-decision LLR inputs using multiple reads.

FIG. 5B is a flow diagram illustrating another embodiment of a process 500B of generating soft-decision LLR inputs using multiple reads. The process 500B includes determining a known reference bit stream recorded in a reference memory location at block 512 and performing a plurality reads of the reference location at a plurality of voltage read levels to obtain a plurality of bit patterns, at least some of which are correlated with bit values of the reference bit stream (block 514). The process 500B may further include determining probability data based at least in part on the number of occurrences of a bit pattern of the plurality of bit patterns and generating possible log likelihood ratios (LLRs) based at least in part on the probability data. At block 520 a sequence of LLRs based at least in part on the possible LLRs and on bit patterns from a multiple read operation on the target memory location is generated and data from a target memory location is decoded using the generated sequence of LLRs.

Multi-Read Approach—Determine Correct Reference Data

The process 500A includes determining correct reference data at block 502, while the process 500B includes determining a known reference bit stream recorded in a reference memory location at block 512. Such reference data may provide a basis for calibration of the soft-decision input generator 142 of FIG. 1B. For example, in certain embodiments, calculated possible LLR values are based on a reference memory location, or known channel, wherein the LLR values are applicable to target memory locations sharing one or more data retention characteristics of the reference location. For example, the reference memory location may have experienced similar environmental conditions, age and/or read/write cycling as the target location(s). The reference location may be located in physical proximity to target locations that are decoded based on analysis of the reference location. In certain embodiments, target locations are located within the same block of data as the reference location. That the reference location has similar device usage history to target locations can be important so that the information collected from the reference location can at least partly reflect the retention variables experienced by the related locations closely enough such that the reference location can be considered a valid reference with respect to the related memory locations.

Determining the correct reference data may include determining a bit stream stored in the reference memory location for reference during calibration of the soft-decision input generator 142. Any suitable or desirable mechanism for determining the correct value of the reference bit stream may be used. For example, the reference memory location may be assigned by the system prior to calibration of the soft-decision input generator 142, and may be pre-programmed with a known bit stream.

Alternatively, in certain embodiments, the reference location does not contain a pre-programmed known bit stream. Instead, the reference bit stream may be determined by decoding the data in the reference location during calibration, as will be further explained below with respect to FIG. 6. In certain embodiments, the error management module 140B is configured to decode the reference memory location using hard-decision techniques. If a selected reference location is not able to be decoded correctly using hard-decision techniques, the calibration module 144 may be configured to select a different memory location to serve as the relevant reference location.

Figure 6:
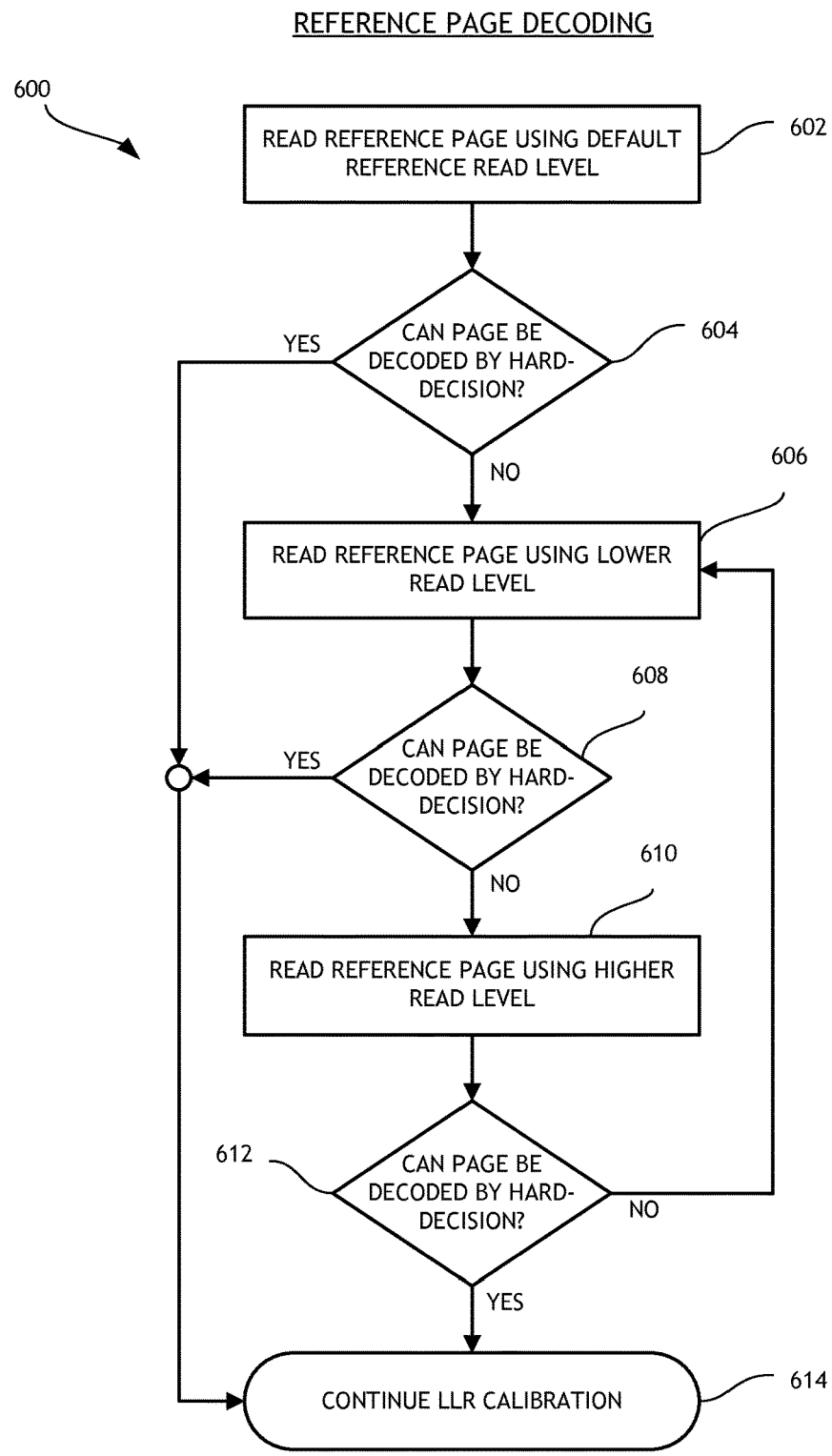
FIG. 6 is a flow chart illustrating an embodiment of a process for decoding a reference bit stream using hard-decision input.

FIG. 6 is a flow chart illustrating an embodiment of a process 600 for decoding a reference bit stream using hard-decision input, which may be performed as an initial, or early, stage of calibration (e.g., as part of block 502 in FIG. 5A or block 512 in FIG. 5B). The process 600 includes reading the reference memory location/page using a default voltage read level. For example, in a 3-read scheme, the default read level may correspond to the intermediate read level. At block 604 it is determined whether the page can be decoded using the default read level to provide hard-decision input. If so, then the process 600 is complete, as the reference page can therefore be correctly decoded. If the page cannot be decoded using hard-decision input, the process 600 includes attempting to decode the page using higher and/or lower voltage read levels, wherein the process 600 terminates upon successful decoding. In certain embodiments, the process 600 loops until the page can be decoded successfully using hard-decision input. Upon completion of the process 600, further calibration steps may be performed, as discussed herein.

Multi-Read Approach—Perform Multi-Read on Reference Data

With further reference to FIG. 5A, once the reference bit stream stored in the reference memory location has been determined, the process 500A includes performing multiple reads on the reference data at block 504. Similarly, in FIG. 5B, in block 514 the process 500B performs a plurality reads of the reference location at a plurality of voltage read levels to obtain a plurality of first bit patterns, at least some of which are correlated with bit values of the reference bit stream. Such reads may be performed in order to generate a plurality of bit streams corresponding to values returned in connection with the plurality of reads. Once the multiple reads are completed, the process 500A includes calculating LLR values based on comparisons of the multiple-read values to the correct reference data at block 506. For example, the raw bits returned from the multiple reads may be combined to form cell-by-cell bit patterns, as shown in the bottom three rows of the columns of Table A below. Table A shows example bit streams obtained through reads of a reference memory location at three different read voltage levels ($R_0$, $R_1$, $R_2$). The top row of bits reflects the correct data stored in the reference memory location. The three voltage read levels may illustratively correspond to those shown in FIG. 4, wherein the three voltage read levels divide the relative distribution spectrum into four zones represented by 3-bit bit patterns.

TABLE A

Reference E-Page Bit Stream

| Correct Data | 0 | 1 | 0 | 0 | 1 | 0 |
|---|---|---|---|---|---|---|
| $R_0$ | 0 | 1 | 0 | 0 | 0 | 0 |
| $R_1$ | 0 | 1 | 1 | 1 | 1 | 0 |
| $R_2$ | 1 | 1 | 1 | 1 | 1 | 0 |

As shown by the vertically-arranged 3-bit bit patterns of the three read levels provided in the columns of the table, each of the four bit patterns illustrated in FIG. 4 is represented in the table. While the table shows 6-bit bit streams in each of the rows, such bit stream size is provided for illustration purposes only, and a given memory location of interest may be significantly larger, comprising thousands of bits or more, for example. Furthermore, more than three reads may be used, or two reads may be used. Calibrating the soft-decision input generator using the data of Table A may include counting the occurrences of each of the bit patterns and comparing the occurrences of the bit patterns to the correct data. As an example, in a 3-read scheme, calibration may include counting the number of times a final corrected bit value '0' corresponds to a bit pattern or '001' returned by the three reads, the number of times a final corrected bit value '0' returns '011,' '000,' and '111.' Further, the four possible bit patterns may also be counted with respect to a final corrected bit value of '1' as well. Therefore, in a 3-read scheme, calibration may include determining approximately 8 data points associated with the 4 counts of possible bit patterns for each correct bit value.

In certain embodiments, in addition to the four theoretically possible bit patterns shown in FIG. 4, various retention factors may allow for the occurrence of bit patterns that are not represented by the four zones (e.g., '101'). Such bit patterns may be referred to as "illegal" bit patterns. In certain embodiments, the occurrences of such illegal bit patterns ('110,' '101,' '100,' '010') are counted as well. Illegal bit patterns may be the result of corruption of a legal bit pattern reading. In certain embodiments, illegal bit patterns are mapped to legal bit patterns to which the most likely correspond. For example, it may be determined that '110' most likely corresponds to a legal bit pattern of '111,' and therefore occurrences of '110' are grouped together with '111' for bit pattern counting/comparing purposes.

Multi-Read Approach—Calculate LLR Values

Figure 7:
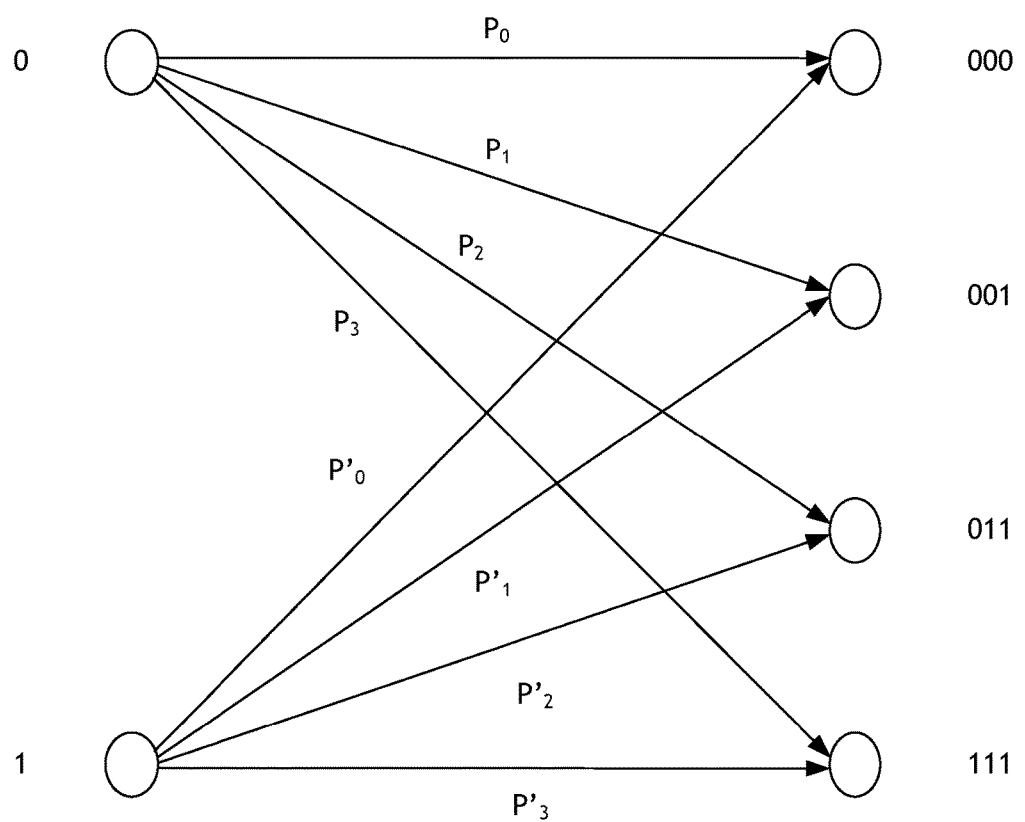
FIG. 7 provides a schematic illustration of the various bit pattern count values that may be calculated in an embodiment.

FIG. 7 provides a schematic illustration of the various bit pattern count values that may be calculated in an embodiment, as referenced in block 506 of FIG. 5A. FIG. 7 in one embodiment may also correspond to blocks 516 and 518 of the process 500B in FIG. 5B, which determines probability data based at least in part on the number of occurrences of a bit pattern of the plurality of first bit patterns and generates possible log likelihood ratios (LLRs) based at least in part on the probability data. The following count values are represented in the figure: (1) $P_0$, representing the number of occurrences of the bit pattern '000' corresponding to reference bits having a correct value of '0;' (2) $P'_0$, representing the number of occurrences of the bit pattern '000' corresponding to reference bits having a correct value of '1;' (3) $P_1$, representing the number of occurrences of the bit pattern '001' corresponding to reference bits having a correct value of '0;' (4) $P'_1$, representing the number of occurrences of the bit pattern '001' corresponding to reference bits having a correct value of 1;' (5) $P_2$, representing the number of occurrences of the bit pattern '011' corresponding to reference bits having a correct value of '0;' (6) $P'_2$, representing the number of occurrences of the bit pattern '011' corresponding to reference bits having a correct value of 1;' (7) $P_3$, representing the number of occurrences of the bit pattern '111' corresponding to reference bits having a correct value of '0;' and (8) $P'_3$, representing the number of occurrences of the bit pattern '111' corresponding to reference bits having a correct value of '1.'.

Once bit pattern counts have been determined, probability data is derived therefrom and used to calculate LLR values corresponding to each of the counted bit patterns. For the LLR calculation, certain embodiments require log-function calculations. Alternatively, M+1 pairs of counts may be sent back to the firmware for log value calculation, where M is the number of multi-reads. Using the bit patter counts listed above, LLR values corresponding to each of the bit patterns may be calculated according to the following log equations:

$$LLR(000) = \log\left(\frac{P0}{P'0}\right)$$

$$LLR(001) = \log\left(\frac{P1}{P'1}\right)$$

$$LLR(011) = \log\left(\frac{P2}{P'2}\right)$$

$$LLR(111) = \log\left(\frac{P3}{P'3}\right)$$

In one embodiment, these LLR values may be scaled by some constants. These calculated possible LLR values may be used to populate one or more LUTs, as described above. Furthermore, the system may be configured to dynamically update LUT entries based on ongoing calibration/decoding operations. In certain MLC embodiments, memory cells comprise upper and lower pages of data, wherein separate LUTs are generated for upper and lower page values. When reading upper page values, the controller 130 (FIG. 1A) may reference lower page data in order to distinguish between read levels R1 and R3, as illustrated in FIG. 2.

Multi-Read Approach—Apply LLR Values to Target Memory Location(s)

With further reference to FIG. 5A, at block 508 of the process 500A, the recorded possible LLR values are applied to decode additional target memory locations that are determined to have retention characteristics similar enough to those of the reference memory location that similar bit pattern probability characteristics can be assumed. For example, when the error management module 140B is unable to decode a memory location/page using hard-decision input, the error management module 140B identifies the LUT(s) associated with such location, looks up the bit patterns that occur based on multiple reads of the memory location, and provides a sequence of LLR values associated with the bit patterns in the LUT(s). In some embodiments, at least a portion of the possible LLR values generated from block 506 is selected at block 508 and applied to the decoding of the target memory location. For example, given this lookup table (LUT) of possible LLR values:

| Bit Pattern | LLR Value |
|---|---|
| 000 | V0 |
| 001 | V1 |
| 011 | V2 |
| 111 | V3 | and three reads of a target page with the following bits returned, LLR value will be selected by matching each bit pattern to the lookup table. For example, the first bit pattern is "000" (three reads of the first cell of the page) which returns the LLR value of $V_1$. The pattern "010" may be considered an illegal state and is mapped one of the values of the lookup table.

| E0 | 0 | 0 | 1 | 0 | 0 | ... |
|---|---|---|---|---|---|---|
| E1 | 0 | 0 | 1 | 1 | 1 | |
| E2 | 1 | 0 | 1 | 1 | 0 | |
| LLR value | V1 | V0 | V3 | V2 | V2 | |

Similarly in FIG. 5B, at block 520 a sequence of LLRs based at least in part on the possible LLRs (from block 518) and on bit patterns from a multiple read operation on the target memory location is generated and data from a target memory location is decoded using the generated sequence of LLRs.

Other Variations

The read levels, states, and coding schemes associated with voltage level distributions described herein, as well as variables and designations used to represent the same, are used for convenience only. As used in this application, "non-volatile solid-state memory" typically refers to solid-state memory such as, but not limited to, NAND flash. However, the systems and methods of this disclosure may also be useful in more conventional hard drives and hybrid hard drives including both solid-state and hard drive components. The solid-state storage devices (e.g., dies) may be physically divided into planes, blocks, pages, and sectors, as is known in the art. Other forms of storage (e.g., battery backed-up volatile DRAM or SRAM devices, magnetic disk drives, etc.) may additionally or alternatively be used.

Those skilled in the art will appreciate that in some embodiments, other types of data storage systems and/or data retention monitoring can be implemented. In addition, the actual steps taken in the processes shown in FIGS. 4 and 6 may differ from those shown in the figures. Depending on the embodiment, certain of the steps described above may be removed, others may be added. Accordingly, the scope of the present disclosure is intended to be defined only by reference to the appended claims.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A data storage device comprising:
   a non-volatile solid-state memory array comprising a plurality of non-volatile solid-state memory devices configured to store data; and
   a controller configured to:
      determine a known reference bit stream comprising a plurality of bit values recorded in a plurality of memory cells, respectively, at a reference memory location;
      obtain a bit pattern for each of the plurality of memory cells at the reference memory location by performing a first plurality of reads on each of the plurality of memory cells at the reference memory location at a plurality of voltage read levels, wherein the bit pattern comprises a bit value from each of the first plurality of reads, wherein the bit pattern is correlated with a respective bit value of the reference bit stream recorded in a respective memory cell at the reference memory location;
      determine probability data based at least in part on a number of occurrences of the respective bit patterns obtained for the plurality of memory cells at the reference memory location and the correlated respective bit values of the reference bit stream;
      generate possible log likelihood ratios (LLRs) based at least in part on the probability data;
      store the possible LLRs in association with the reference memory location;
      select, in connection with a multiple read operation on a target memory location, the stored possible LLRs based on a predetermined association between the target memory location and the reference memory location;
      generate a sequence of LLRs based at least in part on the selected possible LLRs and on bit patterns from a multiple read operation on a target memory location; and
      decode data stored in the target memory location using the generated sequence of LLRs.

2. The data storage device of claim 1, wherein the plurality of voltage read levels comprises at least one of a lower read level, an intermediate read level, and an upper read level.

3. The data storage device of claim 1, wherein the target memory location comprises multiple-level cells storing an upper page and lower page, and wherein the sequence of LLRs correspond to the upper page and are based at least in part on bit values of the lower page.

4. The data storage device of claim 3, wherein the target memory location comprises a plurality of 2-level cells.

5. The data storage device of claim 3, wherein the target memory location comprises a plurality of 3-level cells.

6. The data storage device of claim 1, wherein the controller is configured to use the generated sequence of LLRs when the controller is unable to decode data from the target memory location using a single read of the target memory location.

7. The data storage device of claim 1, wherein performing the plurality of reads comprises performing three reads.

8. The data storage device of claim 1, wherein the controller is further configured to adjust at least one of the plurality of voltage read levels based at least in part on the probability data.

9. The data storage device of claim 1, wherein the plurality of bit values of the reference bit stream comprises an equal number of 1's and 0's.

10. The data storage device of claim 1, wherein the controller is further configured to provide the generated sequence of LLRs to a low-density parity-check (LDPC) encoder.

11. In a data storage system comprising a non-volatile solid state memory array and a controller, a method of storing data, the method comprising:
   determining a known reference bit stream comprising a plurality of bit values recorded in a plurality of memory cells, respectively, at a reference memory location;
   obtaining a bit pattern for each of the plurality of memory cells at the reference memory location by performing a first plurality of reads on each the plurality of memory cells at the reference memory location at a plurality of voltage read levels wherein the bit pattern comprises a bit value from each of the first plurality of reads, wherein the bit pattern is correlated with a respective bit value of the reference bit stream recorded in a respective memory cell at the reference memory location;
   determining probability data based at least in part on a number of occurrences of the respective bit patterns obtained for the plurality of memory cells at the reference memory location and the correlated respective bit values of the reference bit stream;
   generating possible log likelihood ratios (LLRs) based at least in part on the probability data;
   storing the possible LLRs in association with the reference memory location;
   selecting, in connection with a multiple read operation on a target memory location, the stored possible LLRs based on a predetermined association between the target memory location and the reference memory location;
   generating a sequence of LLRs based at least in part on the selected possible LLRs and on the bit patterns from a multiple read operation on a target memory location; and
   decoding data stored in the target memory location using the generated sequence of LLRs.

12. The method of claim 11, wherein the plurality of voltage read levels comprises at least one of a lower read level, an intermediate read level, and an upper read level.

13. The method of claim 11, wherein the target memory location comprises multiple-level cells storing an upper page and lower page, and wherein the sequence of LLRs correspond to the upper page and are based at least in part on bit values of the lower page.

14. The method of claim 11, wherein decoding the data from the target memory location using the generated sequence of LLRs is performed when data from the target memory location is unable to be decoded using a single read of the target memory location.

15. The method of claim 11, further comprising adjusting at least one of the plurality of voltage read levels based at least in part on the probability data.

16. The method of claim 11, further comprising providing the generated sequence of LLRs to a low-density parity-check (LDPC) decoder.

17. The data storage device of claim 1, wherein the controller is further configured to:
   populate at least one look-up table (LUT) with the generated sequence of LLRs;
   periodically decode the data stored in the target memory location; and
   update the at least one LUT based at least in part on the decoded data.

18. The method of claim 11 further comprising:
   populating at least one look-up table (LUT) with the generated sequence of LLRs;
   periodically decoding the data stored in the target memory location; and
   updating the at least one LUT based at least in part on the decoded data.

* * * * *